(12) United States Patent  
Suzuki et al.

(10) Patent No.: US 7,588,380 B2  
(45) Date of Patent: Sep. 15, 2009

(54) LABEL DATA CREATING APPARATUS, LABEL DATA CREATING METHOD, AND COMPUTER PROGRAM PRODUCT

(75) Inventors: Yuichiro Suzuki, Okazaki (JP); Yuji Iida, Chita (JP)

(73) Assignee: Brother Kogyo Kabushiki Kaisha, Aichi-Ken (JP)

( * ) Notice: Subject to any disclaimer, the term of this patent is extended or adjusted under 35 U.S.C. 154(b) by 332 days.

(21) Appl. No.: 11/526,299

(22) Filed: Sep. 25, 2006

(65) Prior Publication Data

US 2007/0081845 A1 Apr. 12, 2007

(30) Foreign Application Priority Data

Oct. 12, 2005 (JP) ............................. 2005-297320

(51) Int. Cl.  
*B41J 11/00* (2006.01)

(52) U.S. Cl. ..................................... 400/615.2; 400/70

(58) Field of Classification Search .............. 400/615.2, 400/70  
See application file for complete search history.

(56) References Cited

U.S. PATENT DOCUMENTS

| | | | | |
|---|---|---|---|---|
| 4,254,416 A | * | 3/1981 | Lelke | 345/472 |
| 5,562,353 A | * | 10/1996 | Handa et al. | 400/615.2 |
| 5,634,728 A | * | 6/1997 | Nunokawa et al. | 400/54 |
| 6,491,454 B1 | * | 12/2002 | Toyosawa et al. | 400/83 |
| 2001/0024590 A1 | * | 9/2001 | Woodman et al. | 400/613 |
| 2004/0036915 A1 | * | 2/2004 | Vleurinck et al. | 358/1.18 |
| 2005/0094205 A1 | * | 5/2005 | Lo et al. | 358/1.18 |

FOREIGN PATENT DOCUMENTS

| | | |
|---|---|---|
| DE | 92 18 594 | 9/1994 |
| EP | 0 497 352 A2 | 8/1992 |
| EP | 1 420 348 A1 | 5/2004 |
| EP | 1 527 891 A1 | 5/2005 |
| JP | 2004-157912 | 3/2004 |

* cited by examiner

*Primary Examiner*—Anthony H. Nguyen  
(74) *Attorney, Agent, or Firm*—Day Pitney LLP

(57) ABSTRACT

It is intended to provide a label data creating apparatus, a label data creating method, and a computer program product which can make the production of label tapes faster, and increase efficiency of the production thereof. A CPU of computer equipment performs a template data create process by an editor with a display, a keyboard and the like, and selects a model name of a tape printer displayed in a transfer destination selection field as a transfer destination, when a transfer command is issued. After the selection, the CPU creates print data composed of block information included in the template data and text data, and then shows error message in the display if at least one value of block height data is smaller than that of the height of the minimum font size stored in the tape printer as the transfer destination, based on the block information of the print data.

2 Claims, 11 Drawing Sheets

LABEL DATA CREATING APPARATUS, LABEL DATA CREATING METHOD, AND COMPUTER PROGRAM PRODUCT

CROSS-REFERENCE TO RELATED APPLICATIONS

This application claims priority from JP 2005-297320, filed Oct. 12, 2005, the contents of which are hereby incorporated by reference.

TECHNICAL FIELD

The disclosure relates to a label data creating apparatus, a label data creating method, and a computer program product for creating and editing print data to be printed on a long tape, and transferring the print data to a tape printer.

BACKGROUND

Conventionally, there have been suggested various kinds of a label data creating apparatus, a label data creating method, and a computer program product for creating and editing print data to be printed on a long tape, and transferring the print data to a tape printer.

For instance, a conventional label data creating apparatus comprises a data creating device, a key assigning unit and a transferring unit. The data creating device creates various kinds of data such as custom font data of bit map data and template data of print format (the number of letters, a font and the like), by means of the data creating device, a data storage unit a display control unit or the like which are achieved by a CPU, based on a signal inputted by a keyboard and a mouse. The key assigning unit assigns a selection key of a tape printer to each kind of the data. The transferring unit transfers the template data and the like which is assigned by the selection key, to the tape printer. (For instance, Japanese Patent Application laid-open No. 2004-157912 (paragraphs [0020] to [0058], FIGS. 1 to 11)).

With the above-described structures, the label data creating apparatus can perform through every operations such as the data creating operation of creating the various kinds of data including the template data and the assigning operation of assigning the selection key to the data, thereby simplifying these operations and developing an efficiency of the operations.

Herein, one example operation of label data creating and transferring process in the label data creating apparatus described above will be explained with reference to FIGS. 11 and 12.

In the conventional label data creating apparatus as shown in FIG. 11, at S101, the CPU of the label data creating apparatus creates template data. The CPU creates the template data including characters by adding thereto the information on the size of the print-area frame which is allocated the print area of the character string, instead of setting the size of the characters, and at S102, transfers the template data to the tape printer. The reason why the size data of the print-area frame is added to the template data is as follows: the label tape which is created by using the template of the tape printer has a size limitation depending on an area to which the label tape to be adhered, so that the label tape which is printed the required information needs to be adhered to the limited area.

On the other hand, on the tape printer side as shown in FIG. 12, at S111, the CPU of the tape printer performs text editing to assign the label data inputted by the keyboard to each print-area frame of the template. At S112, the CPU performs pre-print process to lay out the label data using the stored fonts as large as possible, in each block as the print-area frame of the template. Next at S113, the CPU executes determination process to determine whether any error, such as the absence of the tape cassette, occurs or not. If there is no error (S113 : NO ERROR), the CPU proceeds to the process at S114. At S114, the CPU executes determination process to determine whether the height of the block in the template is as tall as or taller than the height of the minimum font size. If the height of the block is as tall as or taller than the height of the minimum font size (S114 : YES), the CPU prints the print data on the tape, and ends the process at S115. On the contrary, if there is any error (S113 : ERROR OCCURS), or if the height of the block in the template is shorter than the height of the minimum font size (S114 : NO), the CPU proceeds to the process at S116. At S116, the CPU displays the error message, and ends the process.

This makes it possible to eliminate the inconvenience of setting the character size every time when the user lays out the characters in each print-area frame of the template. Also, this can avoid the occurrence of the error by the mismatch between the block size indicating the print area of the template and the size of the fonts stored in the tape printer.

As shown in FIG. 12, however, in the case where the characters cannot be arranged within the block even when the block height is taller than the height of the minimum font size, an error occurs just before printing. In such a case, the user again needs to modify the template in the label data creating apparatus, and transfer the modified template to the tape printer, which charges the user the additional tasks.

SUMMARY

The disclosure has been made in view of the above circumstances and has an object to overcome the above problems and to provide a label data creating apparatus, a label data creating method, and a computer program product which can easily modify template data before print data including the template data is transferred to a tape printer, in the case where the template data cannot be printed in the tape printer using fonts of minimum font size stored in the tape printer is used, thereby making the production of the label tapes faster, and increasing efficiency of the production thereof.

To achieve the above object, there is provided a label data creating apparatus comprising: a display having a display screen; a display control unit that performs display control to display a print field of a long tape on which print data is to be printed, on the display screen of the display; an input device that is used in inputting label data including at least character-string data to the print field displayed on the display screen; a template data create/display unit that creates template data in which a print-area frame is laid out in the print field, the print-area frame being allocated a print area of the label data inputted by the input device in accordance with a character size of the label data, and displays the template data in the print field; a transfer unit that can transfer the print data to a tape printer; a printer information storage unit that prestores printer information on a plurality of tape printers, which includes minimum font size data of a font printable in the tape printer; a tape printer selection mechanism that is used in selecting the tape printer to which the print data including the label data and the template data is to be transferred; a command mechanism that is used in issuing a command to transfer the print data; a determination unit that determines successively at each print-area frame whether height of each print-area frame in the template data is as tall as or taller than the height of a minimum font size printable in the tape printer selected by the tape printer selection mechanism when the command to transfer the print data is issued by the command mechanism; an alert device that alerts that the print data is unprintable in the tape printer to which the print data is to be transferred; a transfer control unit that performs transfer control to transfer the print data to the tape printer which is selected by the tape printer selection mechanism through the transfer unit when the height of each print-area frame in the template data is as tall as or taller than the height of the minimum font size printable in the selected tape printer, and that performs alert control to alert that the print data is unprintable in the tape printer which is selected by the tape printer selection mechanism when the height of at least one frame in the template data is shorter than the height of the minimum font size printable in the tape printer which is selected by the tape printer selection mechanism.

The above label data creating apparatus displays the label data including at least character-string data which is inputted to the print field displayed on the display screen, and creates and displays the template data in which the print-area frame is laid out in the print field, the print-area frame being allocated the print area of the label data inputted by the input device in accordance with the character size of the label data. The label data creating apparatus prestores the printer information on each tape printer, which includes the minimum font size data printable in the tape printer. The label data creating apparatus further selects the tape printer to which the print data is to be transferred, and determines whether the height of the print-area frame in the template data is as tall as or taller than the height of the minimum font size printable in the selected tape printer when the command to transfer the print data is issued. The print data is transferred to the tape printer when the height of the print-area frame in the template data is as tall as or taller than the height of the minimum font size printable in the selected tape printer. On the other hand, the label data creating apparatus alerts that the print data is unprintable in the selected tape printer when the height of at least one frame in the template data is shorter than the height of the minimum font size printable in the selected tape printer.

Accordingly, the user can be informed that the print data including the template created in the label data creating apparatus is the print data including the unprintable template which cannot be printed using the fonts of the minimum font size stored in the tape printer, before the print data is transferred to the tape printer. As a result of this, the template data, which is unprintable using the fonts of the minimum font size stored in the tape printer to which the template data is transferred, can be easily modified before transferred. This can make the production of the label tapes faster, and increase efficiency of the production thereof.

According to a second aspect of the disclosure, there is also provided a label data creating apparatus comprising: a display having a display screen; a control circuit; an input device that is used in inputting label data including at least character-string data; a transfer unit that transfers print data which is to be printed on a long tape to a tape printer; a printer information storage unit that prestores printer information on a plurality of tape printers, which includes minimum font size data of a font printable in the tape printer, for a plurality of tape printers; a tape printer selection mechanism that is used in selecting the tape printer to which the print data is to be transferred; a command mechanism that is used in issuing a command to transfer the print data; and an alert device that alerts that the print data is unprintable in the tape printer to which the print data is to be transferred; wherein the control circuit comprises a processor that executes: a display controlling process of performing display control to display a print field of the long tape on the display screen of the display; a label data inputting process of inputting the label data including at least character-string data, which is inputted with the input device, to the print field displayed on the display screen; a template data creating/displaying process of creating template data in which a print-area frame is laid out in the print field, the print-area frame being allocated a print area of the label data inputted in accordance with a character size of the label data in the label inputting process, and displaying the template data in the print field; a transfer command determination process of determining whether a command to transfer the print data including the label data inputted in the label data inputting process by the command mechanism and the template data created in the template data creating/displaying process is inputted; a tape printer selection process that selects the tape printer to which the print data is to be transferred by the tape printer selection mechanism when it is determined that the command to transfer the print data is inputted; a print-area frame determination process that determines successively at each print-area frame whether height of the print-area frame in the template data is as tall as or taller than the height of a minimum font size printable in the tape printer selected in the tape printer selection process; a print data transfer process of transferring the print data to the tape printer which is selected in the tape printer selection process through the transfer unit when it is determined that the height of each print-area frame in the template data is as tall as or taller than the height of the minimum font size printable in the selected tape printer in the print-area frame determination process; and an error informing process of alerting that the print data is unprintable in the tape printer which is selected in the tape printer selection process by the alert device when it is determined that the height of at least one frame in the template data is shorter than the height of the minimum font size printable in the selected tape printer in the print-area frame determination process.

The above label data creating apparatus displays the print field of the long tape on the screen of the display in the display controlling process and the inputted label data including at least the character-string data on the display screen in the label data inputting process. The template data in which the print-area frame is laid out in the print field, the print-area frame being allocated a print area of the label data inputted in the label inputting process in accordance with a character size of the label data is created and displayed in the template data creating/displaying process. When the label data creating apparatus determines that the command to transfer the print data is inputted in the transfer command determination process, the tape printer to which the print data is transferred is selected in the tape printer selection process. Next, in the print data transfer process, the print data is transferred to the selected tape printer through the transfer unit when it is determined that the height of the print-area frame in the template data is as tall as or taller than the height of the minimum font size printable in the selected tape printer in the print-area frame determination process. On the other hand, in the error informing process, the label data creating apparatus alerts that the print data is unprintable in the selected tape printer by the alert device when it is determined that the height of at least one frame in the template data is shorter than the height of the minimum font size printable in the selected tape printer in the print-area frame determination process.

Accordingly, the user can be informed that the print data including the template created in the label data creating apparatus is the print data including the unprintable template which cannot be printed using the fonts of the minimum font size stored in the tape printer, before the print data is transferred to the tape printer. As a result of this, the template data, which is unprintable using the fonts of the minimum font size stored in the tape printer to which the template data is transferred, can be easily modified before transferred. This can make the production of the label tapes faster, and increase efficiency of the production thereof.

According to a third aspect of the disclosure, there is also provided a label data creating method comprising: a display controlling step of performing display control to display a print field of the long tape on which print data is to be printed on a display screen; a label data inputting step of inputting the label data including at least character-string data to the print field displayed on the display screen; a template data creating/displaying step of creating template data in which a print-area frame is laid out in the print field, the print-area frame being allocated a print area of the label data inputted in accordance with a character size of the label data in the label inputting step, and displaying the template data in the print field; a transfer command determination step of determining whether a command to transfer the print data including the label data inputted in the label data inputting step and the template data created in the template data creating/displaying step is inputted; a tape printer selection step that selects the tape printer to which the print data is to be transferred when it is determined that the command to transfer the print data is inputted; a print-area frame determination step of determining successively at each print-area frame whether height of the print-area frame in the template data is as tall as or taller than a minimum font size printable in the tape printer selected in the tape printer selection step; a print data transfer step of transferring the print data to the tape printer which is selected in the tape printer selection step when it is determined that the height of each print-area frame in the template data is as tall as or taller than the height of the minimum font size printable in the selected tape printer in the print-area frame determination step; and an error informing step of alerting that the print data is unprintable in the tape printer which is selected in the tape printer selection step when it is determined that the height of at least one frame in the template data is shorter than the height of the minimum font size printable in the selected tape printer in the print-area frame determination step.

In the above label data creating method, the print field of the long tape is displayed on the display screen of the display in the display controlling step. The inputted label data including at least character-string data is displayed on the display screen in the label data inputting step. The template data in which the print-area frame is laid out in the print field, the print-area frame being allocated the print area of the label data in accordance with the character size of the label data is created and displayed in the template data creating/displaying step. When the label data creating apparatus determines that the command to transfer the print data is inputted in the transfer command determination step, the tape printer to which the print data is transferred is selected in the tape printer selection step. Next, in the print data transfer step, the print data is transferred to the selected tape printer through the transfer unit when it is determined that the height of the print-area frame in the template data is as tall as or taller than the height of the minimum font size printable in the selected tape printer in the print-area frame determination step. On the other hand, in the error informing step, the label data creating apparatus alerts that the print data is unprintable in the selected tape printer by the alert device when it is determined that the height of at least one frame in the template data is shorter than the height of the minimum font size printable in the selected tape printer in the print-area frame determination step.

Accordingly, the user can be informed that the print data including the template created in the label data creating apparatus is the print data including the unprintable template which cannot be printed using the fonts of the minimum font size stored in the tape printer, before the print data is transferred to the tape printer. As a result of this, the template data, which is unprintable using the fonts of the minimum font size stored in the tape printer to which the template data is transferred, can be easily modified before transferred. This can make the production of the label tapes faster, and increase efficiency of the production thereof.

According to a fourth aspect of the disclosure, there is also provided a computer program product that is used and executed by a label data creating apparatus, comprising: a recording medium that can be read by a computer; and a computer program stored in the recording medium that can be read by the computer, wherein the computer program comprises: a display controlling step of performing display control to display a print field of the long tape on which print data is to be printed on a display screen; a label data inputting step of inputting the label data including at least character-string data to the print field displayed on the display screen; a template data creating/displaying step of creating template data in which a print-area frame is laid out in the print field, the print-area frame being allocated a print area of the label data inputted in accordance with a character size of the label data in the label inputting step, and displaying the template data in the print field; a transfer command determination step of determining whether a command to transfer the print data including the label data inputted in the label data inputting step and the template data created in the template data creating/displaying step is inputted; a tape printer selection step that selects the tape printer to which the print data is to be transferred when it is determined that the command to transfer the print data is inputted; a print-area frame determination step of determining successively at each print-area frame whether height of the print-area frame in the template data is as tall as or taller than a minimum font size printable in the tape printer selected in the tape printer selection step; a print data transfer step of transferring the print data to the tape printer which is selected in the tape printer selection step when it is determined that the height of each print-area frame in the template data is as tall as or taller than the height of the minimum font size printable in the selected tape printer in the print-area frame determination step; and an error informing step of alerting that the print data is unprintable in the tape printer which is selected in the tape printer selection step when it is determined that the height of at least one frame in the template data is shorter than the height of the minimum font size printable in the selected tape printer in the print-area frame determination step.

In the above computer program product, the computer reads the program stored in the printing medium, so that the print field of the tape is displayed on the display screen of the display in the display controlling step. The inputted label data including at least character-string data is displayed on the display screen in the label data inputting step. The template data in which the print-area frame is laid out in the print field, the print-area frame being allocated the print area of the label data in accordance with the character size of the label data is created and displayed in the template data creating/displaying step. When the label data creating apparatus determines that the command to transfer the print data is inputted in the transfer command determination step, the tape printer to which the print data is transferred is selected in the tape printer selection step. Next, in the print data transfer step, the print data is transferred to the selected tape printer through the transfer unit when it is determined that the height of the print-area frame in the template data is as tall as or taller than the height of the minimum font size printable in the selected tape printer in the print-area frame determination step. On the other hand, in the error informing step, the label data creating apparatus alerts that the print data is unprintable in the selected tape printer by the alert device when it is determined that the height of at least one frame in the template data is shorter than the height of the minimum font size printable in the selected tape printer in the print-area frame determination step.

Accordingly, the computer can inform the user that the print data including the created template is the print data including the unprintable template which cannot be printed using the fonts of the minimum font size stored in the tape printer, before the print data is transferred to the tape printer, if the print data includes the template data which cannot be printed using the fonts of the minimum font size stored in the tape printer. As a result of this, the template data, which is unprintable using the fonts of the minimum font size stored in the tape printer to which the template data is transferred, can be easily modified before transferred. This can make the production of the label tapes faster, and increase efficiency of the production thereof.

DETAILED DESCRIPTION

A detailed description of an exemplary embodiment of a label data creating apparatus, a label data creating method, and a computer program product of the disclosure will now be given referring to the accompanying drawings.

Figure 1:
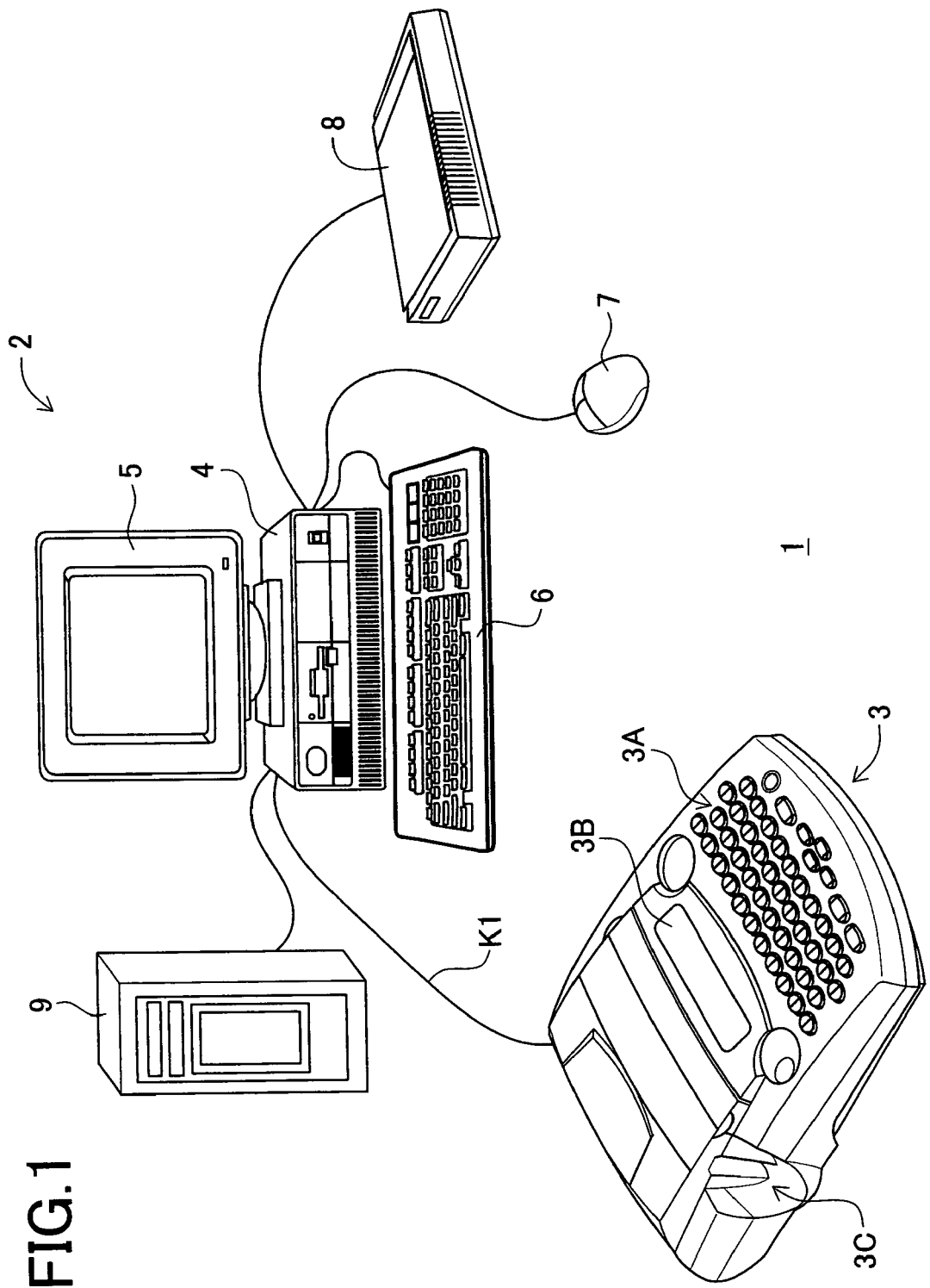
FIG. 1 is a schematic perspective view of a label printing system of an exemplary embodiment/embodiment.

As shown in FIG. 1, a label printing system 1 is composed of computer equipment 2 including a personal computer and the like, and a tape printer 3 connected to the computer equipment 2 through a signal cable K1.

The computer equipment 2 comprises a host controller 4, a display (such as CRT, LCD, PD and the like) 5, a keyboard 6, a mouse 7, an image scanner 8, and a CD-RW drive 9. It is noted that the mouse 7 can be replaced with a joy stick or a track ball. CD-RW drive 9 can be also substituted by a MO drive or a DVD drive.

A tape cassette 3D (see FIG. 2), which will be described later, is mounted on the tape printer 3. The tape cassette 3D holds therein a long adhesive-backed tape of a predetermined width or less (approximately 24 mm or less in this exemplary embodiment). The tape printer 3 performs printing on the adhesive-backed tape, and produces an adhesive print tape on which desired characters and the like are printed, based on a print command from the computer equipment 2.

The tape printer 3 comprises a keyboard 3A having a plurality of character keys and control keys on the top, and a display 3B which displays a label image to be referred in a label editing process. A tape discharging port 3C through which the printed tape is discharged outside is provided on the side of the tape printer 3. Based on the print command from the computer equipment 2, the adhesive print tape on which the desired characters are printed is discharged through the tape discharging port 3C.

Next, a print mechanism of the tape printer 3 when the tape cassette 3D is installed therein will be explained with reference to FIG. 2.

Figure 2:
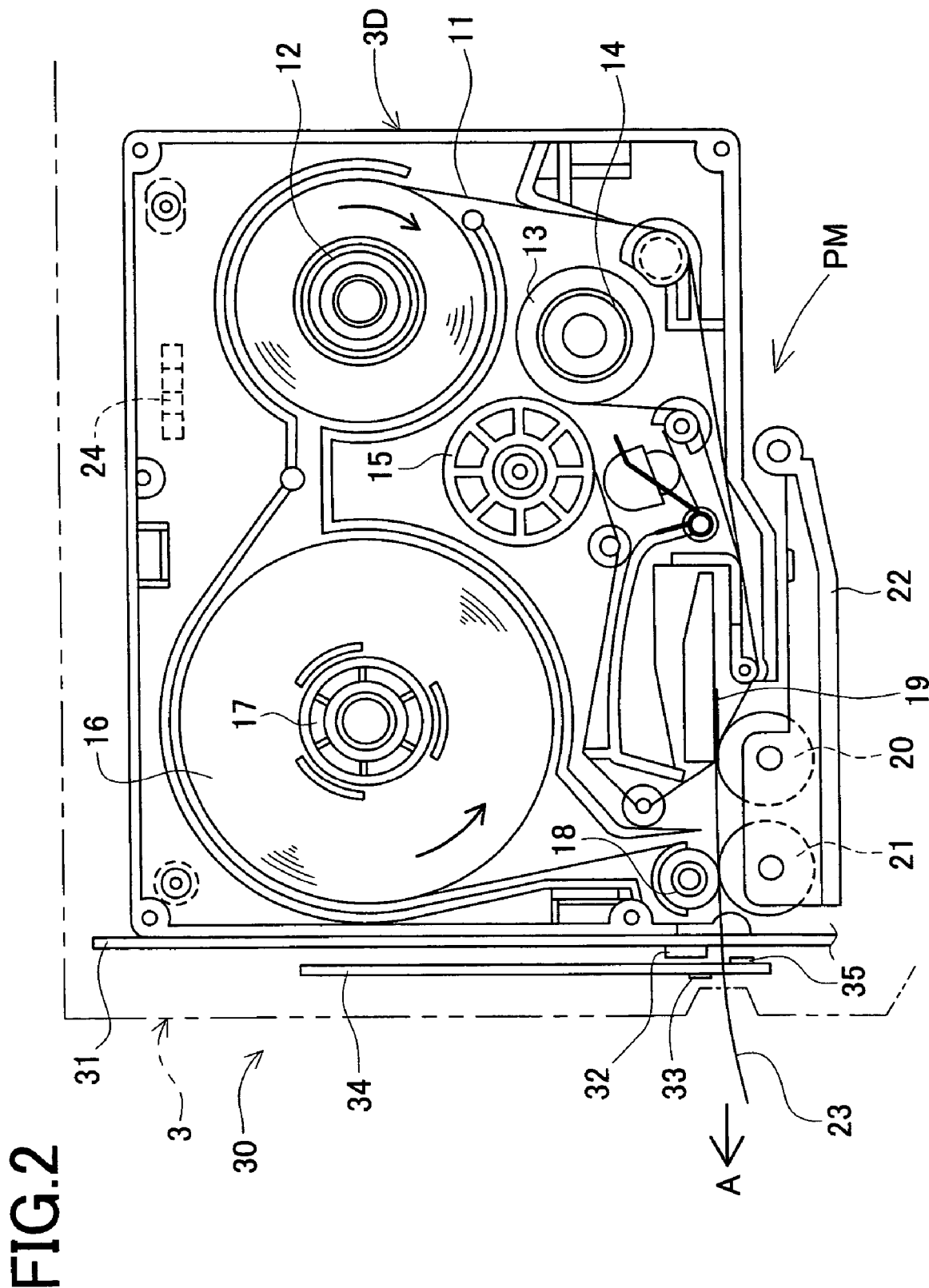
FIG. 2 is a plan view of a schematic structure of a print mechanism of a tape printer which is shown in FIG. 1, when a tape cassette is installed in the print mechanism.

As shown in FIG. 2, the rectangular tape cassette 3D is removably installed in a print mechanism PM. Within the tape cassette 3D, a tape spool 12, an ink ribbon supply spool 14, an ink ribbon take-up spool 15, a supply spool 17 and a press roller 18 are rotatably provided. A laminated film tape 11 is wound on the tape spool 12. An ink ribbon 13 is withdrawn from the ink ribbon supply spool 14, and wound up onto the ink ribbon take-up spool 15. A double-sided adhesive tape 16 of the same width as the laminated film tape 11 is wound on the supply spool 17 with a release paper being on the outside. The press roller 18 bonds the laminated film tape 11 and the double-sided adhesive tape 16 together.

A thermal head 19 is uprightly placed on a position where the laminated film tape 11 and the ink ribbon 13 are brought to overlap each other. A platen roller 20 and a feed roller 21 are turnably supported by a support body 22 which is pivotally provided in a main frame of the tape printer 3, being rotatable. The platen roller 20 presses the laminated film tape 11 and the ink ribbon 13 against the thermal head 19. The feed roller 21 presses the laminated film tape 11 and the double-sided adhesive tape 16 against the press roller 18. In the thermal head 19, five-hundred-and-twelve heating elements are vertically provided in rows.

Accordingly, the press roller 18 and the ink ribbon take-up spool 15 are synchronously rotated in each predetermined rotational direction in accordance with the rotation of a tape feed motor 72 (see FIG. 5) in a predetermined rotational direction. When the heating elements of the thermal head 19 are energized in such a rotational movement of the press roller 18 and the ink ribbon take-up spool 15, characters, bar codes and the like are printed on the laminated film tape 11 with multiple dot lines. Further, the printed laminated film tape 11 is adhered to the double-sided adhesive tape 16 is discharged outside as a print tape 23, through a tape discharge port 3C in a tape feeding direction A. It is noted that the printing mechanism PM is substantially same as the mechanism disclosed in, for instance, the Japanese patent application laid-open No.H02(1990)-106555. Thus, the detailed explanation of the printing mechanism PM is herein omitted.

Next, a tape cutter 30 for automatically cutting the print tape 23 will be briefly explained. A plate-like supplemental frame 31 is elevationally provided in immediately inside portion of a main frame of the tape printer 3 which corresponds to the left side of the tape cassette 3D, and a fixed blade 32 is upwardly fixed to the supplemental frame 31. A front-end vicinity portion of an operation lever 34 extending in a backward-forward direction is turnably supported by a left-right directional pivotally supporting axis 33 fixed to the supplemental frame 31. A movable blade 35 is mounted to oppose the fixed blade 32 in a position corresponding to a forward side from the pivotally supporting axis 33 of the operation lever 34. A rear end portion of the operation lever 34 is formed of a pivotal drive mechanism (not shown) connected to a cutting motor 74 (see FIG. 5) to be vertically pivotable. In a normal mode, the movable blade 35 is maintained spaced away from the fixed blade 32.

The print tape 23, on which printing has been performed by the thermal head 19 is guided from the tape cassette 3D to pass between the fixed blade 32 and the movable blade 35 and to extend out from the tape discharge port 3C. As such, the rear end portion of the operation lever 34 is vertically pivoted through the pivotal drive mechanism by the cutting motor 74 driven by a cutting signal, whereby the movable blade 35 is moved close to or approaches the fixed blade 32, and the print tape 23 is cut by the two blades 32 and 35.

Five types of the print tapes 23 to be fed from individual tape cassettes 3D are prepared for use. The types individually have the tape widths of 6 mm, 9 mm, 12 mm, 18 mm, and 24 mm. To enable detecting the differences in the tape widths of the five types of the print tapes 23, a protrusion piece 24 formed of a combination of the presence and absence of four protrusion tabs is provided on a bottom wall portion of each of the tape cassettes 3D. A cassette sensor 68 (see FIG. 5) for detecting the tape width from the combination of the four protrusion tabs of the protrusion piece 24 is mounted on a bottom wall portion of the main frame that supports the lower portion of the tape cassette 3D. More specifically, in accordance with the combination of the four protrusion tabs constituting the protrusion piece 24, the cassette sensor 68 outputs a different cassette signal depending on the tape width. For example, a "0100" cassette signal is output when the tape width is 18 mm, a "1100" cassette signal is output when the tape width is 24 mm, and a "0000" cassette signal is output when no tape cassette 3D is inserted.

The circuit configuration of the computer equipment 2 of the label printing system 1 will now be described herebelow with reference to FIG. 3.

Figure 3:
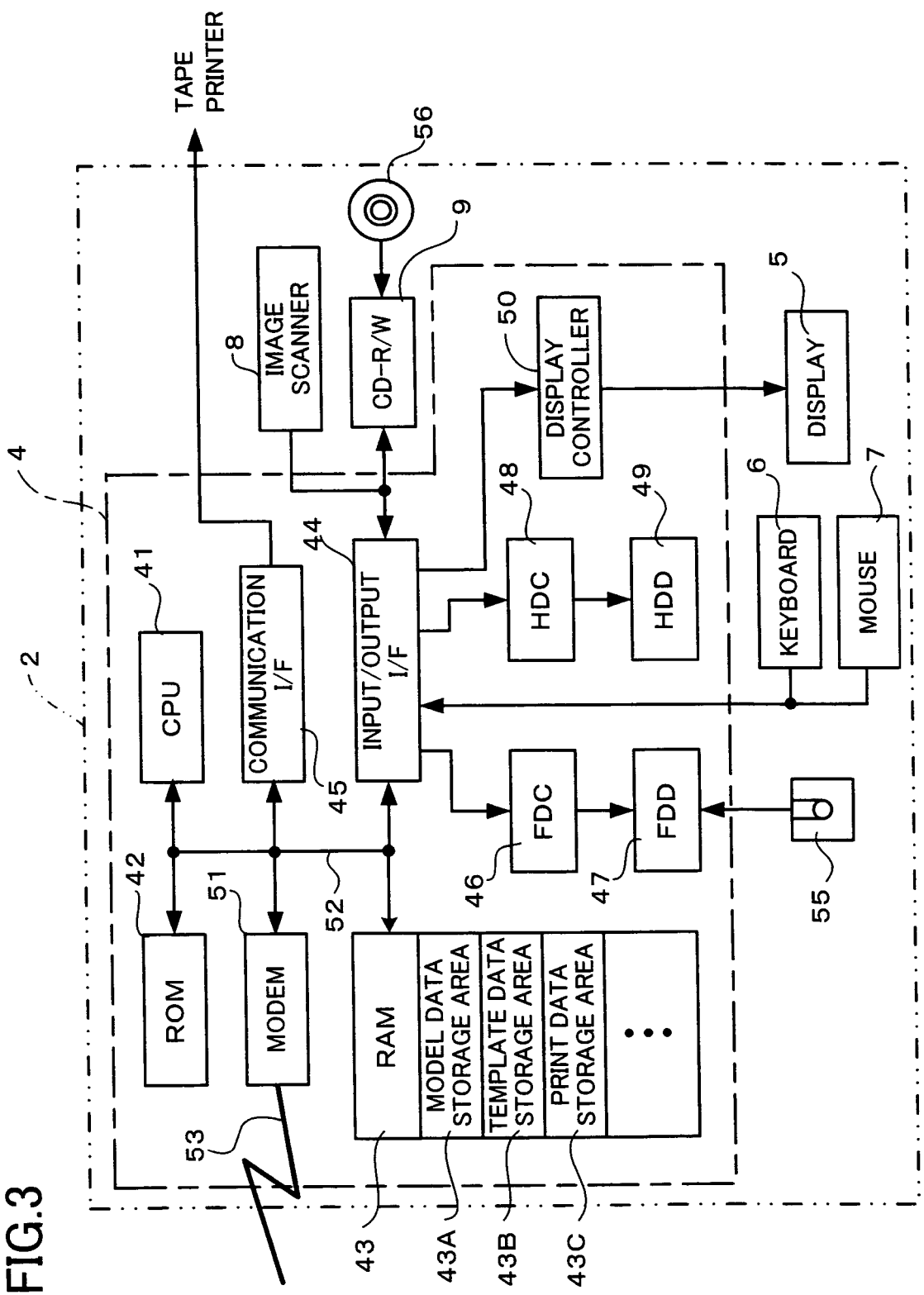
FIG. 3 is a circuit block diagram of a circuit structure of a main part of computer equipment which is shown in FIG. 1.

Referring to FIG. 3, the host controller 4 of the computer equipment 2 has a CPU 41, a ROM 42, a RAM 43, an input/output interface (I/F) 44, a communication interface (I/F) 45, a Floppy™ disc controller (FDC) 46, a Floppy™ disc drive (FDD) 47, a hard disc controller (HDC) 48, a hard disc drive (HDD) 49, a display controller 50, a modem 51, and the like. The CPU 41, the ROM 42, the RAM 43, the input/output I/F 44, the communication I/F 45, and the modem 51 are interconnected through a bus line 52, whereby intercommunication of data is performed. To the input/output I/F 44, the FDD 47 and the HDD 49 are connected through the FDC 46 controlling the FDD 47 and the HDC 48 controlling the HDD 49 respectively. The display controller 50 is also connected to the input/output I/F 44. A telephone line 53 is connected to the modem 51.

The keyboard 6, the mouse 7, the image scanner 8 and the CD-RW drive 9 are connected to the host controller 4. The keyboard 6 is used for entering characters and symbols through the input/output I/F 44. The image scanner 8 is used for capturing visible outline data and the like from drawings.

The CD-RW drive 9 is for writing into and reading from a CD-ROM 56, printing data and a program for creating templates and controlling transfer, which will be described later, and the like. Also, the display 5 is connected to the host controller 4. The display 5 displays through the display controller 50, a print field 82 (see FIG. 7) in which a print area of label data entered as described later is laid out and the like. Further, the tape printer 3 is connected to the host controller 4, through the communication I/F 45 and the signal cable K1.

The CPU 41 controls the whole label printing system 1, and manages the all data on the operation of the label printing system 1. The ROM 42 stores a startup program for booting the computer 2 at power-on, which is in common with general personal computers.

The RAM 43 temporarily stores different types of data when the CPU 41 performs various kinds of control. The RAM 43 has a model data storage area 43A, a template storage area 43B and a print data storage area 43C. The model data storage area 43A stores printer information on various kinds of printers, which will be described later. The template storage area 43B stores template data in which a plurality of print-area frames are laid out in the print field, each of the print-area frames being allocated the print area of the label data entered corresponding to the print field of the print tape 23. The print data storage area 43C stores the print data transferred to the tape printer 3, including the template data and text data entered from the keyboard 6 and the like and corresponding to the label data of each print-area frame.

The communication I/F 45 is composed of, for instance, a Centronics interface and USB (Universal Serial Bus), which allows interactive data communications with the tape printer 3 and an external electronic equipment (such as a computer and a laser printer).

The hard disc mounted on the HDD 49 stores an operating system (OS) of various kinds such as MS-DOS™ and Windows™. In addition, the hard disc also stores communication protocols for data communications with the tape printer 3 and the external electronic equipment, application programs such as a word processing software executable in the OS and a data creating software for printing as required. The hard disc further stores a control program for controlling a template data create and transfer process, which will be described later.

A Floppy™ disc (FD) 55 which is easy to be inserted in or removed from the FDD 47 stores a variety of data obtained by the template data create and transfer process, which will be described later.

An optical disc (CD-ROM) which is easy to be inserted in or removed from the CD-RW drive 9 stores control programs of the template data create and transfer process and various templates in which a plurality of print-area frames are previously laid out corresponding to the print area of the print tape 23, which will be send to the computer equipment 2.

Such programs for controlling the template data create and transfer process and the template in which a plurality of print-area frames are laid out in the print field of the print tape 23 can be recorded in a computer readable recording medium such as a semiconductor memory, a hard disk, a Floppy™ disk, a data card (for instance, an IC card and a magnetic card), an optical disk (for instance, CD-ROM and DVD), a magneto-optical disk (For instance, MD), a phase change disk, and a magnetic tape, and can be used by loading in the computer and starting up as required. Besides, programs can be stored in the ROM or backup RAM, and may be used by loading the ROM or backup RAM in the computer.

One example of the printer information stored in the model data storage area 43A of the RAM 43 of the host controller 4 will be explained with reference to FIG. 4. It is noted that the printer information is stored in formats varying with models of the tape printer 3.

Figure 4:
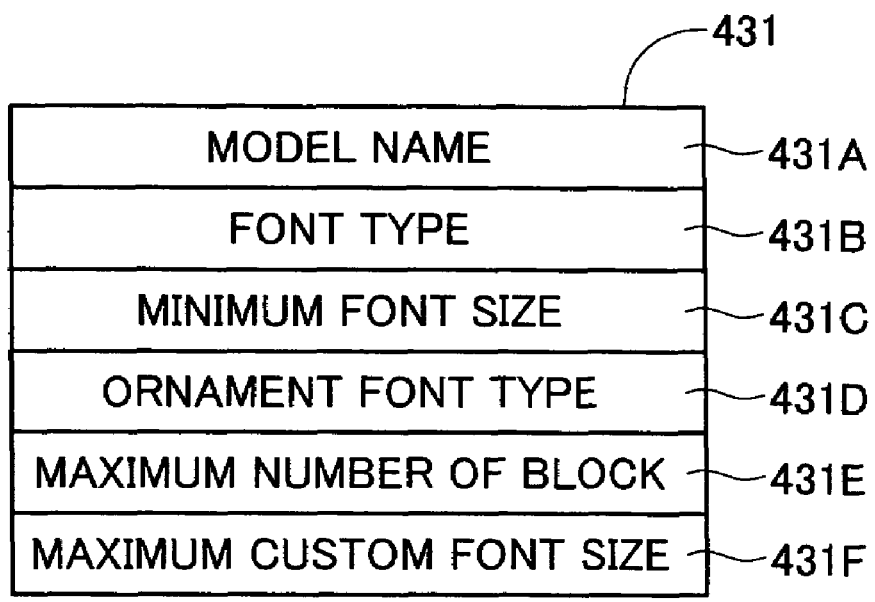
FIG. 4 is a diagram showing one example of printer information of the tape printer, which is stored in a model data storage area shown in FIG. 3.

As shown in FIG. 4, printer information 431 includes a model name 431A, a font type 431B, a minimum font size 431C, an ornament font type 431D, a maximum number of block 431E and a maximum custom font size 431F. The model name 431A indicates a type of the tape printer 3 (the model name). The font type 431B indicates the font type stored in the tape printer 3 of the model. The minimum font size 431C indicates the minimum font size stored in the tape printer 3 of the model. The ornament font type 431D indicates the ornament font type stored in the tape printer 3 of the model. The maximum number of block 431E indicates the maximum number of a plurality of print-area frames (hereinafter, "blocks") each of which is capable of being allocated the print area of the label which can be printed in the tape printer 3 of the model. The maximum custom font size 431F indicates the maximum custom font size which can be printed in the tape printer 3 of the model.

The circuit configuration of the tape printer 3 will now be described herebelow with reference to FIG. 5.

Figure 5:
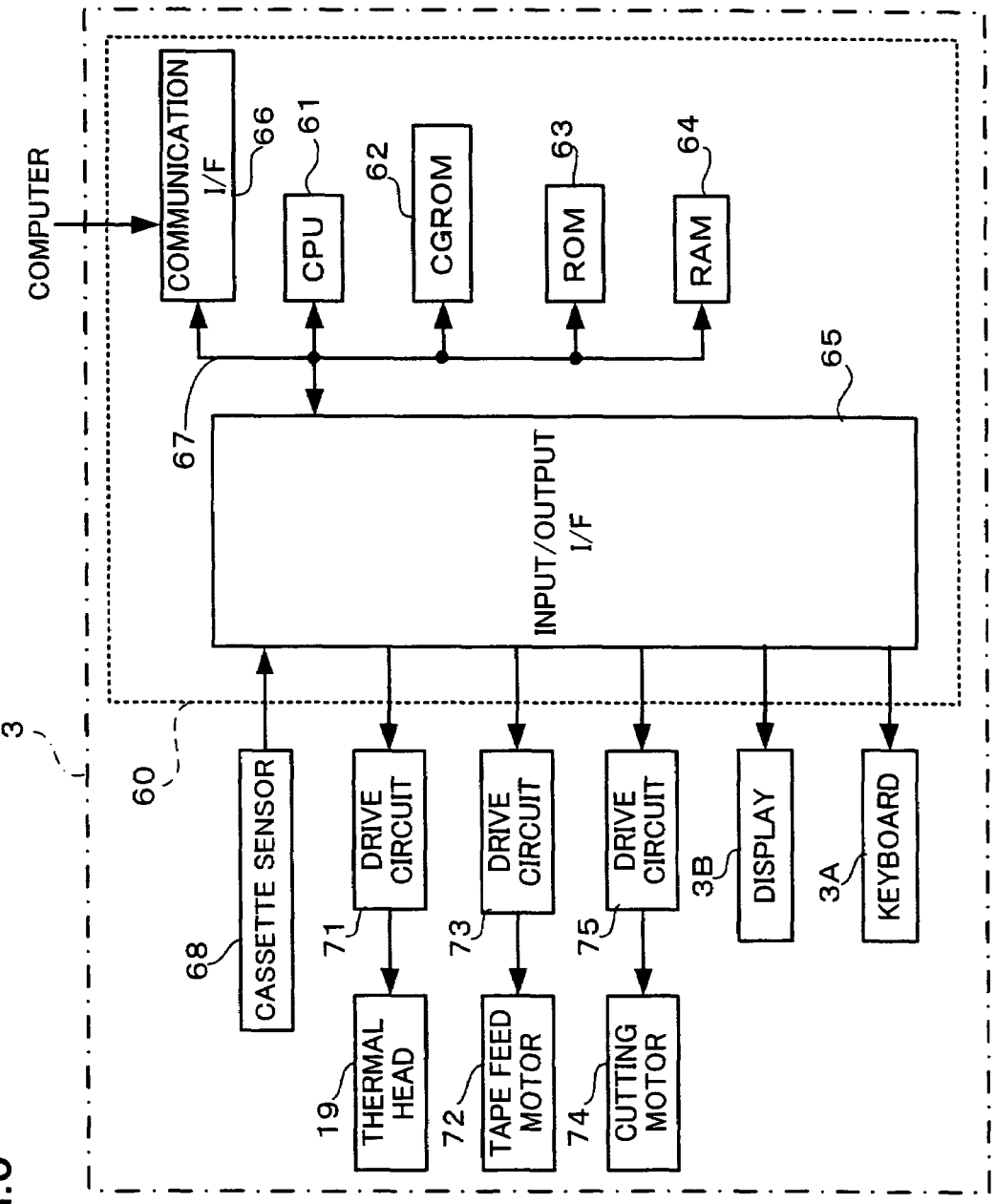
FIG. 5 is a circuit diagram of a circuit structure of a main part of the tape printer which is shown in FIG. 1.

As shown in FIG. 5, a control circuit 60 of the tape printer 3 has a CPU 61, a character generator ROM 62 ("CGROM"), a ROM 63, a RAM 64, an input/output interface ("I/F") 65, a communication I/F 66 and the like, which are interconnected through a bus line 67, whereby intercommunication of data is performed.

Dot pattern data corresponding to individual characters are stored in the CGROM 62.

The ROM 63 stores various types of computer programs, such as a print control program required to control the tape printer 3, which will be described later. The CPU 61 executes various operations in accordance with the individual programs stored in the ROM 63. The CGROM 62 stores outline data related to individual large numbers of characters for defining outlines of the characters. The characters of the outline data are classified in units of a typeface (Gothic typeface, Mincho typeface, or the like), in correlation to code data. The dot pattern data is extracted to an image buffer in accordance with the outline data.

The RAM 64 temporarily stores various results of operations performed by the CPU 61. The RAM 64 also temporarily stores the print data when printing is performed on the laminated tape 11 by the thermal head 19. In the RAM 64, a text memory, the image buffer and a print buffer are provided.

To the input/output I/F 65, the keyboard 3A, the display 3B, the cassette sensor 68 and drive circuits 71, 73 and 75 are individually connected. The drive circuit 71 is used for driving the thermal head 19. The drive circuit 73 is used for driving the tape feed motor 72. The drive circuit 75 is used for driving the cutting motor 74.

The communication I/F 66 is composed of, for instance, a Centronics interface and a USB, which allows the interactive data communications with the computer equipment 2 and the external electronic equipment (such as a computer and a laser printer).

Next, the template data create and transfer process of the computer equipment 2 of the tape printing system 1 configured as above will be explained with reference to FIGS. 6 through 9.

Figure 6:
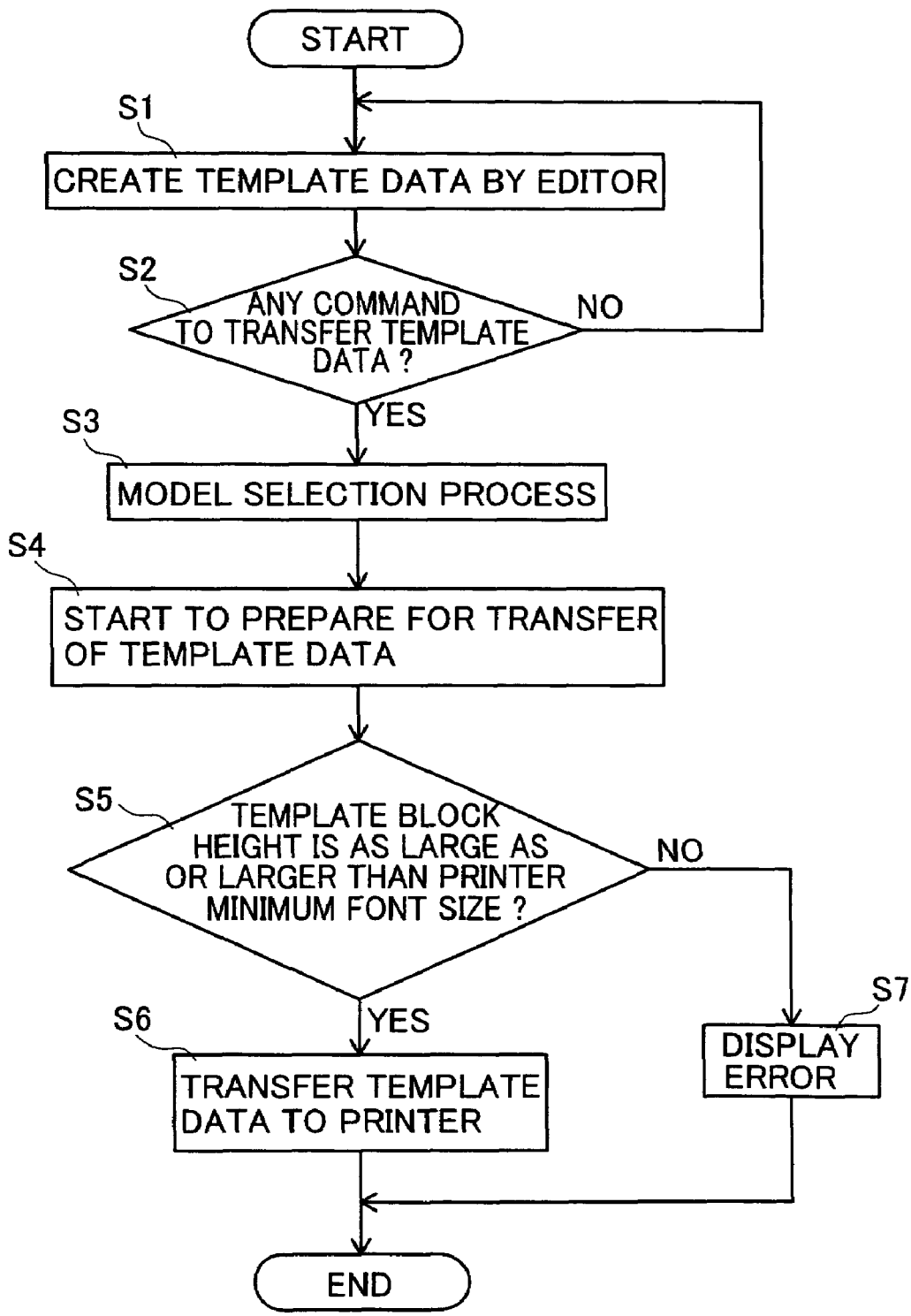
FIG. 6 is a flowchart of controlling process of a template data creating/transferring process in the computer equipment which is shown in FIG. 1.

As shown in FIG. 6, at Step (hereinafter, "S") 1, the CPU 41 of the computer equipment 2 performs a template data create process by an editor with the display 5, the keyboard 6 and the mouse 7.

Figure 7:
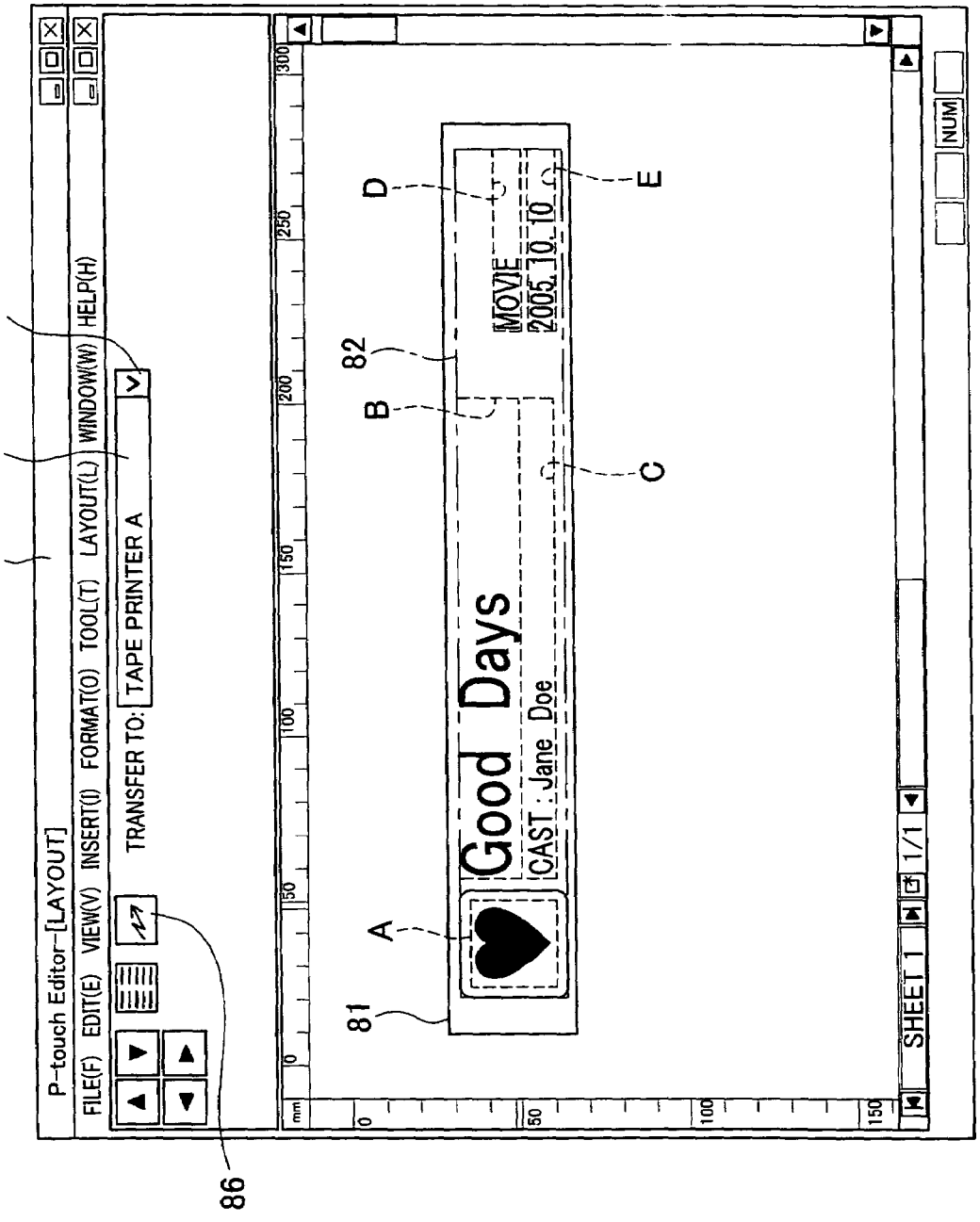
FIG. 7 is a diagram showing one example of a template which is displayed in a display when the template data is created by the computer which is shown in FIG. 1.

More specifically, as shown in FIG. 7, the CPU 41 displays an oblong-rectangular-shaped tape 81 in the display 5. The print field 82 shaped like an oblong rectangle is indicated by an alternate long and short dashed lines inside the tape 81. The user selects a coordinate point inside the print field 82 by the mouse 7 and the like, and designates sizes of individual characters and pictures as the label data by the keyboard 6 and the like. The CPU 41 displays the characters and pictures of the designated size at the selected position. The CPU 41 also lays out the print-area frames (blocks) each of which is allocated the print area of the label data in accordance with the size of the character of the label data. At the same time, the CPU 41 stores the label data corresponding to the individual print-area frames (blocks) as the text data and the image data corresponding to the individual print-area frames (blocks) into the RAM 43.

For instance, the CPU 41 displays an entered pattern in the shape of a heart in a left end portion of the print field 82. Simultaneously, the CPU 41 lays out the print-area frame which is allocated the print area so that the print-area frame surrounds the heart-shaped pattern, and stores the print-area frame as a block A, and the heart-shaped pattern as the image data related to the block A, into the RAM 43. The CPU 41 further displays the entered label data of "Good Days" in an approximately upper half part of the right of the heart-shaped pattern data. At the same time, the CPU 41 lays out the print-area frame which is allocated the print area so that the print-area frame surrounds the text of "Good Days", and stores the print-area frame as a block B, and the text data of "Good Days" as the text data related to the block B, into the RAM 43. The CPU 41 further displays the entered label data of "CAST : Jane Doe" under the block B of "Good Days". At the same time, the CPU 41 lays out the print-area frame which is allocated the print area so that the print-area frame surrounds the text of "CAST : Jane Doe", and stores the print-area frame as a block C, and the text data of "CAST : Jane Doe" as the text data related to the block C, into the RAM 43. The CPU 41 further displays the entered label data of "MOVIE" in a lower right side portion of the print field 82. At the same time, the CPU 41 lays out the print-area frame which is allocated the print area so that the print-area frame surrounds the text of "MOVIE", and stores the print-area frame as a block D, and the text data of "MOVIE" as the text data related to the block D, into the RAM 43. The CPU 41 further displays the entered label data of "2005.10.10" under the block D of "MOVIE". At the same time, the CPU 41 lays out the print-area frame which is allocated the print area so that the print-area frame surrounds the text of "MOVIE", and stores the print-area frame as a block E, and the text data of "MOVIE" as the text data related to the block E, into the RAM 43.

The CPU 41 creates, with respect to each of the print-area frames (blocks), block start position data indicating a print start position of the print-area frame, block height data indicating a height of the print-area frame in a tape width direction, block low end position data indicating a height of the lower edge of the print-area frame from a low end of the print field 82, and block length data indicating a length of the print-area frame in a tape feeding direction. The CPU 41 stores the data as block information corresponding to the print-area frame (block) into the template data storage area 43B. Accordingly, the template data corresponding to the tape 81 displayed in the display 5 is created.

Figure 8:
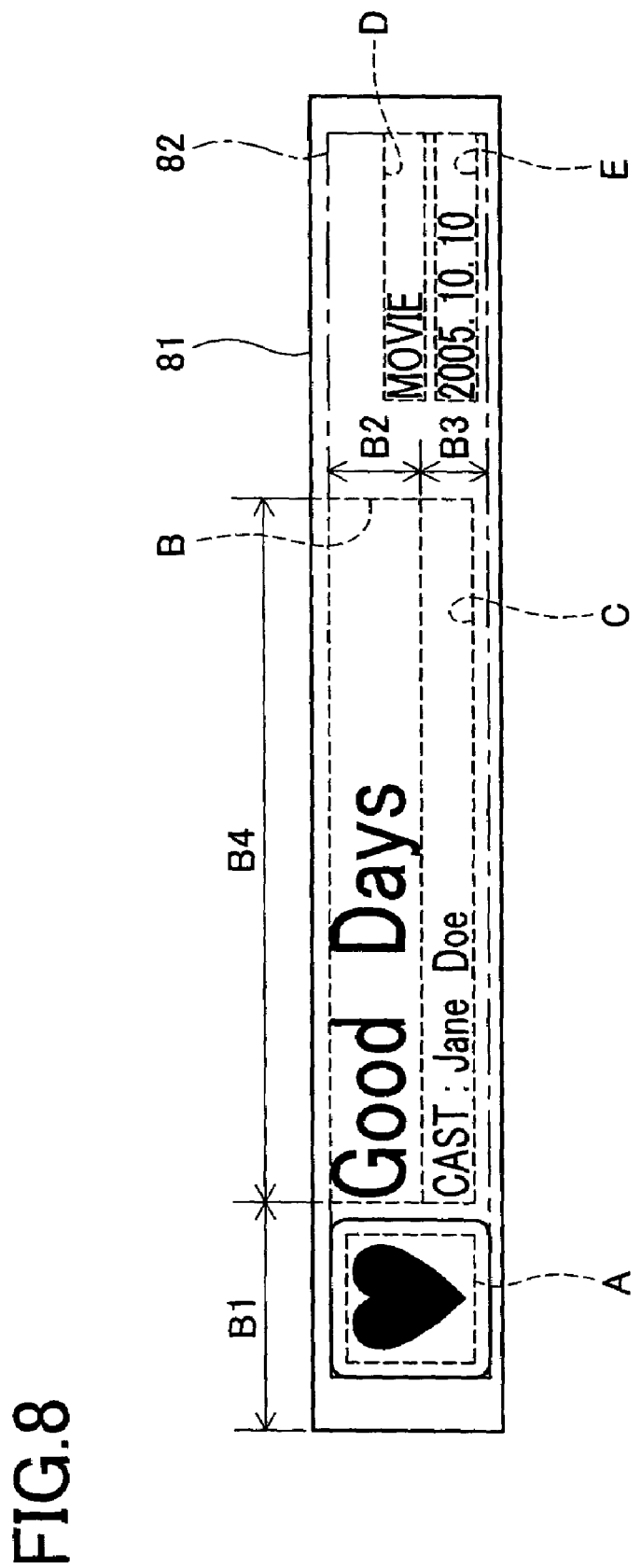
FIG. 8 is an explanatory diagram of block information of a block B which is shown in FIG. 7.

For instance, as shown in FIG. 8, the CPU 41 creates the block information including a block start position B1 as the block start position data, a block height B2 as the block height data, a block low end position B3 as the block low end position data, and a block length B4 as the block length data.

The CPU 41 stores them as the block information corresponding to the block B into the template data storage area 43B.

At S2, the CPU 41 performs a determination process to determine whether a transfer button 86 which is displayed in the display 5 is selected or not with the mouse 7, or equivalently, whether a command for transferring the print data is issued or not. If the command for transferring the print data is not issued (S2 : NO), the CPU 41 performs again the process at S1 and the followings.

On the contrary, if the command for transferring the print data is issued (S2 : YES), the CPU 41 proceeds to the process at S3.

At S3, the CPU 41 executes a model selecting process to select a type (model name) of the tape printer 3 to which the print data is transferred.

More specifically, the CPU 41 executes a determination process to determine whether a selection button 85A which is displayed in a right end portion of a transfer destination selection field 85 is selected with the mouse 7 or not. If the selection button 85A is not selected with the mouse 7, the CPU 41 determines that the model name shown in the transfer destination selection field 85 is the type of the tape printer 3 to which the print data is to be transferred, and stores it into the RAM 43. On the contrary, if the selection button 85A is selected with the mouse 7, the CPU 41 displays all model names of the printer information 431 stored in the model data storage area 43A, and displays the model name which is pointed and selected with the mouse 7 in the transfer destination selection field 85, simultaneously determining the model name as the type of the tape printer 3 to which the print data is to be transferred, and storing the model name into the RAM 43.

At S4, the CPU 41 reads out the block information included in the template data from the template data storage area 43B. The CPU 41 also reads out the text data and the image data related to individual blocks from the RAM 43. The CPU 41 creates the print data which is to be transferred to the tape printer 3 from the template data, the text data and the image data, and stores into the print data storage area 43C, starting to prepare for the transfer of the print data to the tape printer 3.

Figure 9:
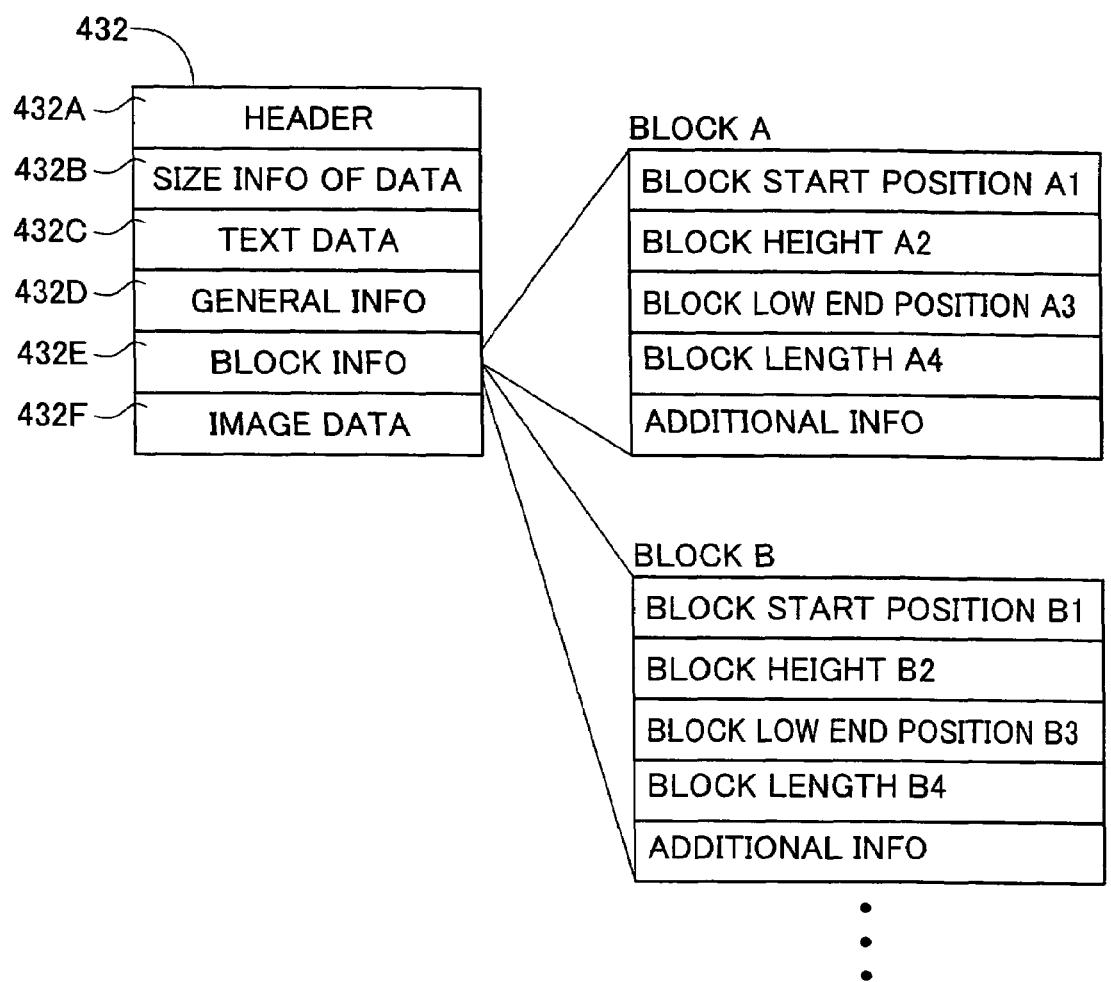
FIG. 9 is a diagram showing one example of the print data which is stored in a print data storage area corresponding to the template which is shown in FIG. 7.

For instance, as shown in FIG. 9, print data 432 includes header 432A indicating header information such as the type of the print data file and sumcheck, size information 432B indicating the data size of the data, text data 432C composed of the text data related to the individual blocks, general information 432D composed of data showing numbers and sizes of the text data, the block information and the image data, block information 432E composed of the block information of the individual print-area frames (blocks), and image data 432F composed of the image data related to the individual blocks.

Next, at S5, the CPU 41 reads out the type (the model name) of the tape printer 3 of the transfer destination selected at S3 from the RAM 43, thereby reading the data of the minimum font size 431C of the printer information 431 corresponding to the type (the model name) of the tape printer 3, from the model data storage area 43A. The CPU 41 stores the data of the minimum font size 431C as the minimum font size stored in the tape printer 3 into the RAM 43. Next, the CPU 41 successively reads in the block height data of the block information of the print-area frame (for instance, the block height A2, the block height B2 or the like) from the print data stored in the print data storage area 43C, and executes the determination process to determine whether the block height is as tall as or taller than the height of the minimum font size.

If all values of the block height data of the block information of all print-area frames (blocks) are as large as or larger than that of the height of the minimum font size (S5 : YES), the CPU 41 proceeds to the process of S6. At S6, the CPU 41 transfers the print data stored in the print data storage area 43C to the tape printer 3 through the communication I/F 45. After that, the CPU 41 ends the whole processes.

On the contrary, if any one value of the block height data of the block information of the print-area frames (blocks) is smaller than that of the height of the minimum font size (S5 ; NO), the CPU 41 proceeds to the process of S7. At S7, the CPU 41 indicates the print-area frame (block) of which height is shorter than the height of the minimum font size, by blinking the print-area frame (block) with red color, or white and black, and simultaneously shows the error message saying "Unprintable due to size smaller than minimum font size" or the like, then ends the process. With this arrangement, the user can enlarge the print-area frame (block) which is smaller than the minimum font size in height by using the mouse 7, or change the label data to another having larger character size. Accordingly, all values of the block height data of the block information of all print-area frames (blocks) can be set as large as or larger than that of the height of the minimum font size before the print data is transferred to the tape printer 3.

Next, template print process of the tape printer 3 of the label printing system 1 as configured as above will be explained with reference to FIG. 10.

Figure 10:
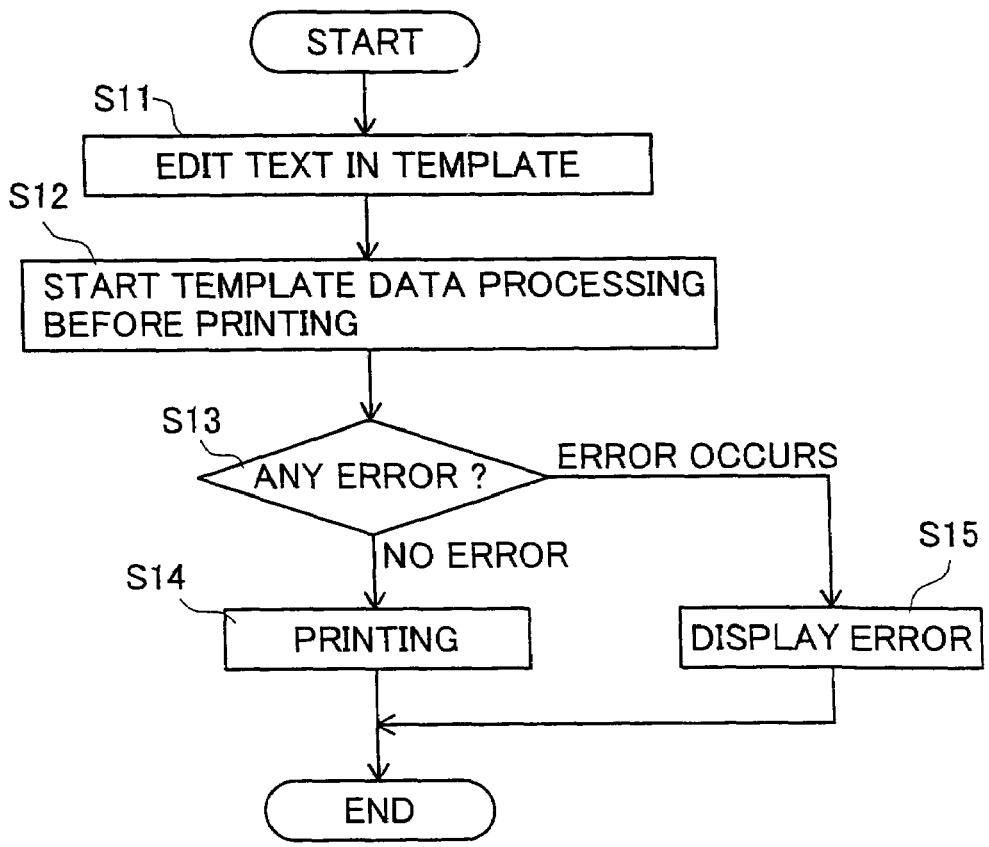
FIG. 10 is a flowchart of template printing process by the tape printer which is shown in FIG. 1.
Figure 11:
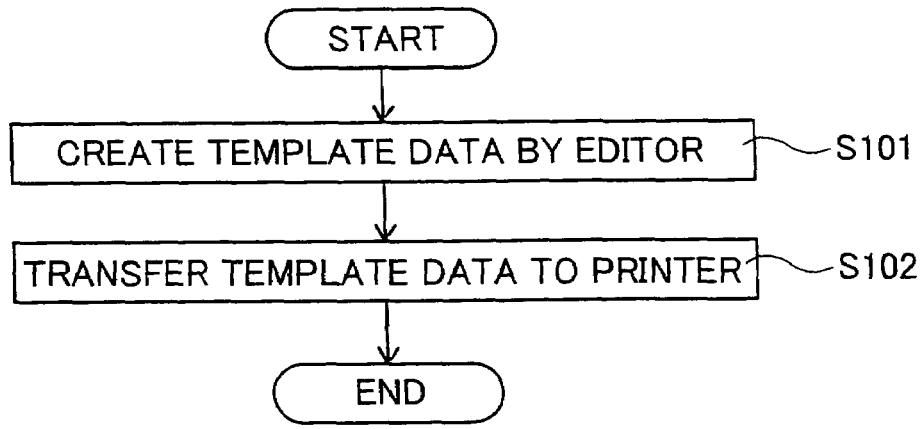
FIG. 11 is a flowchart of controlling template data creating/transferring process by computer equipment of a conventional label printing system.
Figure 12:
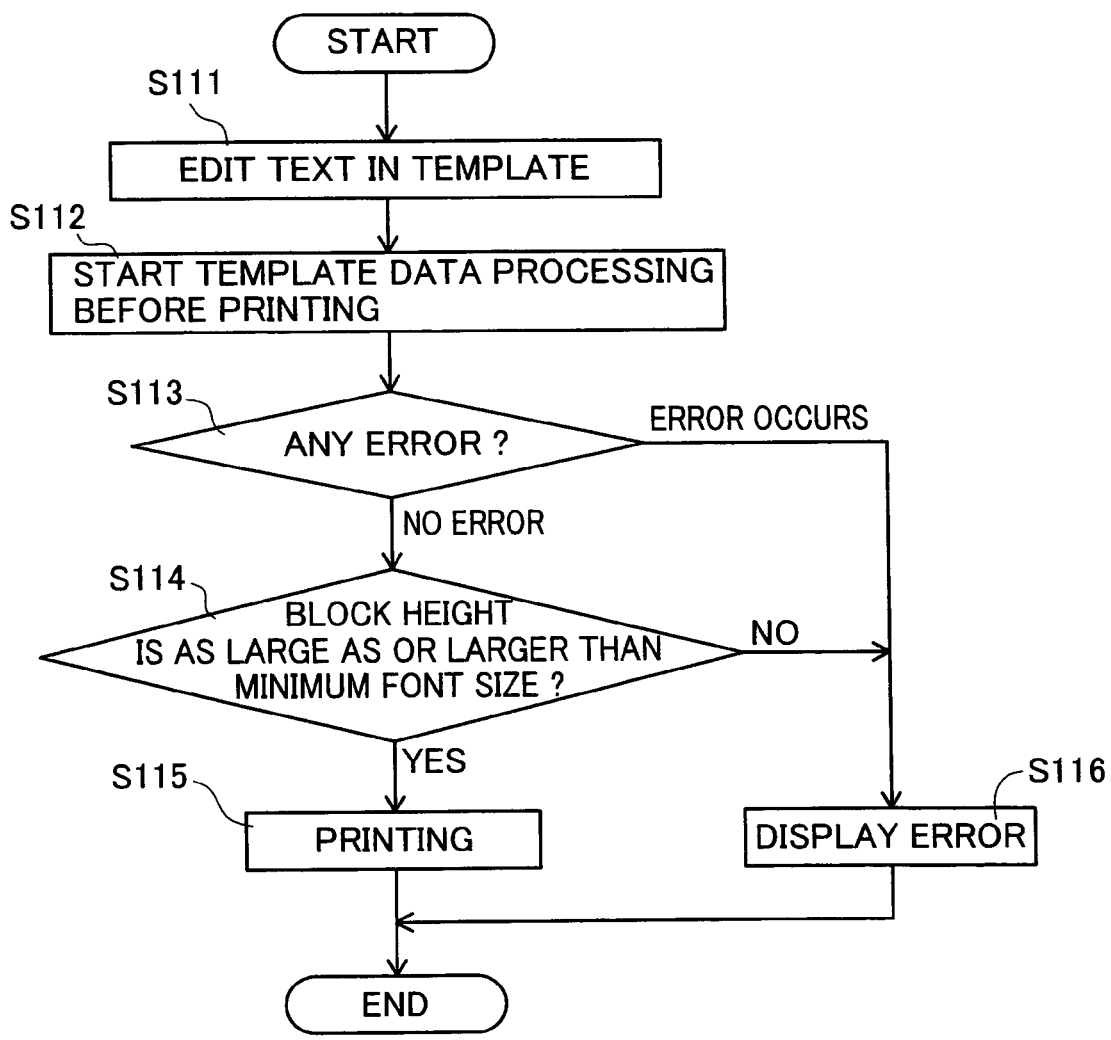
FIG. 12 is a flowchart of a template printing process by a tape printer of the label printing system which is shown in FIG. 11.

As shown in FIG. 10, at S11, the CPU 61 of the tape printer 3 stores the print data transferred from the computer equipment 2 into the RAM 64. The CPU 61 further executes an editing process to lay out the text data and the image data in the individual print-area frames (blocks) of the print data.

At S12, the CPU 61 displays the template in the display 3B on the basis of the block information. The CPU 61 lays out the text data and the image data of the print data in the individual print-area frames (blocks) of the template using the fonts as large as possible stored in the tape printer 3 to display the label data thereof, and creates the print data of the tape printer 3, which is stored in the RAM 64. Noted that the user can delete or modify the label data displayed in the print-area frames (blocks) by using the keyboard 3A of the tape printer 3.

At S13, the CPU 61 performs a determination process to determine whether any error, such as the absence of the tape cassette 3D, occurs or not. If there is no error (S13 : NO ERROR), the CPU 61 proceeds to the process at S14. At S14, the CPU 61 prints the print data on the tape, and ends the processes.

On the contrary, if there is any error such as the absence of the tape cassette 3D (S13: ERROR OCCURS), the CPU 61 proceeds to the process at S15. At S15, the CPU 61 displays an error message in the display 3B, and ends the processes.

As described in detail above, in the label printing system 1 of the exemplary embodiment, the CPU 41 of the computer equipment 2 performs the template data create process in the editor with the display 5, the keyboard 6 and the mouse 7 (S1). When the transfer button 86 in the display is selected with the mouse 7, and the command for transferring the print data is issued, the CPU 41 creates the print data including the text data and the block information which constitutes the template, after selecting the tape printer 3 as the transfer destination of the print data from the model names shown in the transfer destination selection field 85 of the display, and stores the print data into the print data storage area 43C (S2 to S4). Next, if all values of the block height data of the block information of print-area frames (blocks) are as large as or larger than that of the height of the minimum font size stored in the tape printer 3, the CPU 41 transfers the print data to the tape printer 3. If at least one value of the block height data of the blocks is smaller than that of the height of the minimum font size, the CPU 41 shows the error message in the display (S5 to S7).

Accordingly, the user can be informed that the print data including the block information of the template and the text data related to the individual blocks which are created in the computer equipment 2 is unprintable even with the fonts of the minimum font size stored in the tape printer 3, before the print data is transferred to the tape printer 3. As a result of this, the template data, which is unprintable using the fonts of the minimum font size stored in the tape printer 3 to which the template data is transferred, can be easily modified before transferred. This can make the production of the label tapes faster, and increase efficiency of the production thereof.

The disclosure may be embodied in other specific forms without departing from the essential characteristics thereof.

For instance, in the exemplary embodiment/embodiment, the user can select the type of the tape printer 3 by the transfer destination selection field 85. The CPU 41 of the computer equipment 2 can request the transfer from the tape printer 3 of the minimum font size data stored therein, and can receive the minimum font size data directly. This makes it possible to make the production of the label tapes faster, and increase efficiency of creating the label tapes.

While the presently exemplary embodiment has been shown and described, it is to be understood that this disclosure is for the purpose of illustration and that various changes and modifications may be made without departing from the scope of the disclosure as set forth in the appended claims.

What is claimed is:

1. A label data creating apparatus comprising: a display having a display screen;
   a display control unit that performs display control to display a print field of a long tape on which print data is to be printed, on the display screen of the display;
   an input device that is used in inputting label data including at least character-string data to the print field displayed on the display screen;
   a template data create/display unit that creates template data in which a print-area frame is laid out in the print field, the print-area frame being allocated a print area of the label data inputted by the input device in accordance with a character size of the label data, and displays the template data in the print field;
   a transfer unit that can transfer the print data to a tape printer;
   a printer information storage unit that prestores printer information on a plurality of tape printers, which includes minimum font size data of a font printable in the tape printer;
   a tape printer selection mechanism that is used in selecting the tape printer to which the print data including the label data and the template data is to be transferred;
   a command mechanism that is used in issuing a command to transfer the print data;
   a determination unit that determines successively at each print-area frame whether height of each print-area frame in the template data is as tall as or taller than the height of a minimum font size printable in the tape printer selected by the tape printer selection mechanism when the command to transfer the print data is issued by the command mechanism;
   an alert device that alerts that the print data is unprintable in the tape printer to which the print data is to be transferred;
   a transfer control unit that performs transfer control to transfer the print data to the tape printer which is selected by the tape printer selection mechanism through the transfer unit when the height of each print-area frame in the template data is as tall as or taller than the height of the minimum font size printable in the selected tape printer, and that performs alert control to alert that the print data is unprintable in the tape printer which is selected by the tape printer selection mechanism when the height of at least one frame in the template data is shorter than the height of the minimum font size printable in the tape printer which is selected by the tape printer selection mechanism.

2. A label data creating apparatus comprising:
   a display having a display screen;
   a control circuit;
   an input device that is used in inputting label data including at least character-string data;
   a transfer unit that transfers print data which is to be printed on a long tape to a tape printer;
   a printer information storage unit that prestores printer information on a plurality of tape printers, which includes minimum font size data of a font printable in the tape printer, for a plurality of tape printers;
   a tape printer selection mechanism tha is used in selecting the tape printer to which the print data is to be transferred;
   a command mechanism that is used in issuing a command to transfer the print data; and
   an alert device that alerts that the print data is unprintable in the tape printer to which the print data is to be transferred;
   wherein the control circuit comprises a processor that executes:
   a display controlling process of performing display control to display a print field of the long tape on the display screen of the display;
   a label data inputting process of inputting the label data including at least character-string data, which is inputted with the input device, to the print field displayed on the display screen;
   a template data creating/displaying process of creating template data in which a print-area frame is laid out in the print field, the print-area frame being allocated a print area of the label data inputted in accordance with a character size of the label data in the label inputting process, and displaying the template data in the print field;
   a transfer command determination process of determining whether a command to transfer the print data including the label data inputted in the label data inputting process by the command mechanism and the template data created in the template data creating/displaying process is inputted;
   a tape printer selection process that selects the tape printer to which the print data is to be transferred by the tape printer selection mechanism when it is determined that the command to transfer the print data is inputted;
   a print-area frame determination process that determines successively at each print-area frame whether height of the print-area frame in the template data is as tall as or taller than the height of a minimum font size printable in the tape printer selected in the tape printer selection process;
   a print data transfer process of transferring the print data to the tape printer which is selected in the tape printer selection process through the transfer unit when it is determined that the height of each print-area frame in the template data is as tall as or taller than the height of the minimum font size printable in the selected tape printer in the print-area frame determination process; and an error informing process of alerting that the print data is unprintable in the tape printer which is selected in the tape printer selection process by the alert device when it is determined that the height of at least one frame in the template data is shorter than the height of the minimum font size printable in the selected tape printer in the print-area frame determination process.

* * * * *

UNITED STATES PATENT AND TRADEMARK OFFICE
Certificate

Patent No. 7,588,380 B2                                                Patented: September 15, 2009

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Yuichiro Suzuki, Okazaki (JP); Yuji Iida, Chita (JP); and Yasunori Suzuki, Nagoya (JP).

Signed and Sealed this Twenty-First Day of August 2012.

<div style="text-align:right">

JUDY NGUYEN
*Supervisory Patent Examiner*
Art Unit 2854
Technology Center 2800

</div>